United States Patent
Colrain et al.

(10) Patent No.: US 7,475,127 B2
(45) Date of Patent: Jan. 6, 2009

(54) REAL COMPOSITE OBJECTS FOR PROVIDING HIGH AVAILABILITY OF RESOURCES ON NETWORKED SYSTEMS

(75) Inventors: Carol Lyndall Colrain, Redwood Shores, CA (US); David Brower, Alamo, CA (US); Jonathan Creighton, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1088 days.

(21) Appl. No.: 10/308,918

(22) Filed: Dec. 2, 2002

(65) Prior Publication Data

US 2003/0105866 A1 Jun. 5, 2003

Related U.S. Application Data

(60) Provisional application No. 60/334,349, filed on Nov. 30, 2001, provisional application No. 60/426,587, filed on Nov. 15, 2002.

(51) Int. Cl.
*G06F 15/173* (2006.01)
*G06F 15/16* (2006.01)

(52) U.S. Cl. .................. 709/223; 709/226; 709/201; 709/248

(58) Field of Classification Search ......... 709/208–211, 709/223–226, 229, 201, 248
See application file for complete search history.

(56) References Cited

U.S. PATENT DOCUMENTS

| 5,005,122 | A | | 4/1991 | Griffin et al. | |
|---|---|---|---|---|---|
| 5,214,778 | A | | 5/1993 | Glider et al. | |
| 5,361,347 | A | * | 11/1994 | Glider et al. | 714/44 |
| 5,463,733 | A | | 10/1995 | Forman et al. | |
| 5,771,388 | A | * | 6/1998 | Mondrik et al. | 710/262 |
| 5,805,785 | A | * | 9/1998 | Dias et al. | 714/4 |
| 5,847,955 | A | * | 12/1998 | Mitchell et al. | 700/86 |
| 5,996,075 | A | | 11/1999 | Matena | |

(Continued)

FOREIGN PATENT DOCUMENTS

EP 1 024 428 A2 8/2000

(Continued)

OTHER PUBLICATIONS

International Preliminary Examination Report from PCT for foreign patent application No. PCT/US02/38389, dated Aug. 30, 2004 (9 pgs).

(Continued)

*Primary Examiner*—William C. Vaughn, Jr.
*Assistant Examiner*—Kristie D Shingles
(74) *Attorney, Agent, or Firm*—Hickman Palermo Truong & Becker LLP

(57) ABSTRACT

A composite resource is established that includes a plurality of members. Each of the members is capable of providing a comparable service. A coordinator monitors a state of each member of the composite resource. A component requests the service from the coordinator. The coordinator arranges for the service to be provided to the component by a particular member of the composite resource. When the particular member ceases to be active, the service is automatically provided to the component by another member in the composite resource. A state of the composite resource is maintained independently of the state of each member in the composite resource.

48 Claims, 8 Drawing Sheets

U.S. PATENT DOCUMENTS

| | | | |
|---|---|---|---|
| 6,092,220 A | 7/2000 | Palmer et al. | |
| 6,134,673 A | 10/2000 | Chrabaszcz | |
| 6,151,688 A | 11/2000 | Wipfel et al. | |
| 6,178,529 B1* | 1/2001 | Short et al. | 714/51 |
| 6,332,023 B1 | 12/2001 | Porter et al. | |
| 6,339,785 B1* | 1/2002 | Feigenbaum | 709/213 |
| 6,427,163 B1* | 7/2002 | Arendt et al. | 709/201 |
| 6,430,611 B1* | 8/2002 | Kita et al. | 709/223 |
| 6,449,641 B1* | 9/2002 | Moiin et al. | 709/220 |
| 6,466,980 B1* | 10/2002 | Lumelsky et al. | 709/226 |
| 6,516,348 B1* | 2/2003 | MacFarlane et al. | 709/224 |
| 6,523,078 B1* | 2/2003 | Desai | 710/200 |
| 6,564,240 B2* | 5/2003 | Waldo et al. | 718/104 |
| 6,633,538 B1 | 10/2003 | Tanaka et al. | |
| 6,697,805 B1* | 2/2004 | Choquier et al. | 707/10 |
| 6,718,486 B1* | 4/2004 | Roselli et al. | 714/41 |
| 6,732,166 B1* | 5/2004 | Woodruff | 709/221 |
| 6,748,381 B1* | 6/2004 | Chao et al. | 707/10 |
| 6,789,213 B2* | 9/2004 | Kumar et al. | 714/13 |
| 6,854,069 B2 | 2/2005 | Kampa et al. | |
| 6,886,035 B2* | 4/2005 | Wolff | 709/219 |
| 6,906,709 B1* | 6/2005 | Larkin et al. | 345/419 |
| 6,938,084 B2* | 8/2005 | Gamache et al. | 709/226 |
| 6,950,874 B2* | 9/2005 | Chang et al. | 709/229 |
| 6,961,681 B1* | 11/2005 | Choquier et al. | 703/2 |
| 6,970,913 B1* | 11/2005 | Albert et al. | 709/217 |
| 6,973,500 B1* | 12/2005 | Yamamoto et al. | 709/229 |
| 7,039,827 B2* | 5/2006 | Meyer et al. | 714/4 |
| 7,054,932 B2* | 5/2006 | Herrmann et al. | 709/226 |
| 7,058,014 B2* | 6/2006 | Sim | 370/230 |
| 7,133,891 B1* | 11/2006 | Uceda-Sosa et al. | 709/203 |
| 7,225,467 B2* | 5/2007 | Dapp | 726/23 |
| 2003/0009551 A1 | 1/2003 | Benfield et al. | |
| 2003/0233594 A1 | 12/2003 | Earl | |

FOREIGN PATENT DOCUMENTS

| | | |
|---|---|---|
| WO | WO 96/23257 A1 | 8/1996 |
| WO | WO 02/21276 A1 | 3/2002 |

OTHER PUBLICATIONS

State Intellectual Prperty Office of P.R.C., "Notification of the First Office Action," App. No. 02823436.7, received on Jan. 18, 2007, 6 pages.

* cited by examiner

REAL COMPOSITE OBJECTS FOR PROVIDING HIGH AVAILABILITY OF RESOURCES ON NETWORKED SYSTEMS

REFERENCED APPLICATIONS

This application claims benefit of priority to a U.S. Provisional Application having Ser. No. 60/334,349, filed Nov. 30, 2001, entitled "Rapid Recovery Events, Virtual Composite Objects, And Enable/Disable Attributes For Simple and Composite Resources For Use In A High Availability Framework," naming Colrain et. al as inventors; and to U.S. Provisional Application having Ser. No. 60/426,587, filed Nov. 15, 2002, entitled "Virtual Composite Objects for Providing High Availability of Resources on Networked Systems". The aforementioned priority applications are hereby incorporated by reference.

FIELD OF THE INVENTION

The present invention relates to resource management of networked systems. In particular, the present invention relates to a real composite object for managing a networked system.

BACKGROUND OF THE INVENTION

In a cluster of nodes, availability of resources is an important consideration. As a result, some of the resources in the cluster are made redundantly available in order to increase the reliability and availability of the cluster. When one node or resource fails, a mechanism typically exists to enable the use of a similar resource on another one of the nodes.

Current systems stack the resources of a node. In a stack, resources develop dependencies on one another. Thus, a mid-tier resource may have a dependency on a lower-tier resource, while an application or other top-level program may have a dependency on the lower-tiered resources. In the past, managing the dependencies of the resources on the stack has been problematic when failure occurs.

One solution has been to reconstruct the stack of a node where failure has occurred entirely on a different node. Even when only one resource has failed, the solution typically provided is to reconstruct the entire stack elsewhere. As a result, the failure of the resource on one node causes a delay in the system's ability to provide redundant services for the node where failure occurred. The delay is often long enough to interrupt the quality and availability of the services being provided from the node cluster.

Another solution that has been tried in the past is to use the framework to facilitate the switch-over between nodes when failure occurs. In this type of solution, the framework that interconnects the nodes of the cluster rebuilds the stack of a node where failure occurred. In such systems, the availability of the node cluster depends on the responsiveness of the framework, and the framework's ability to reconstruct the stack of resources on a different node.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
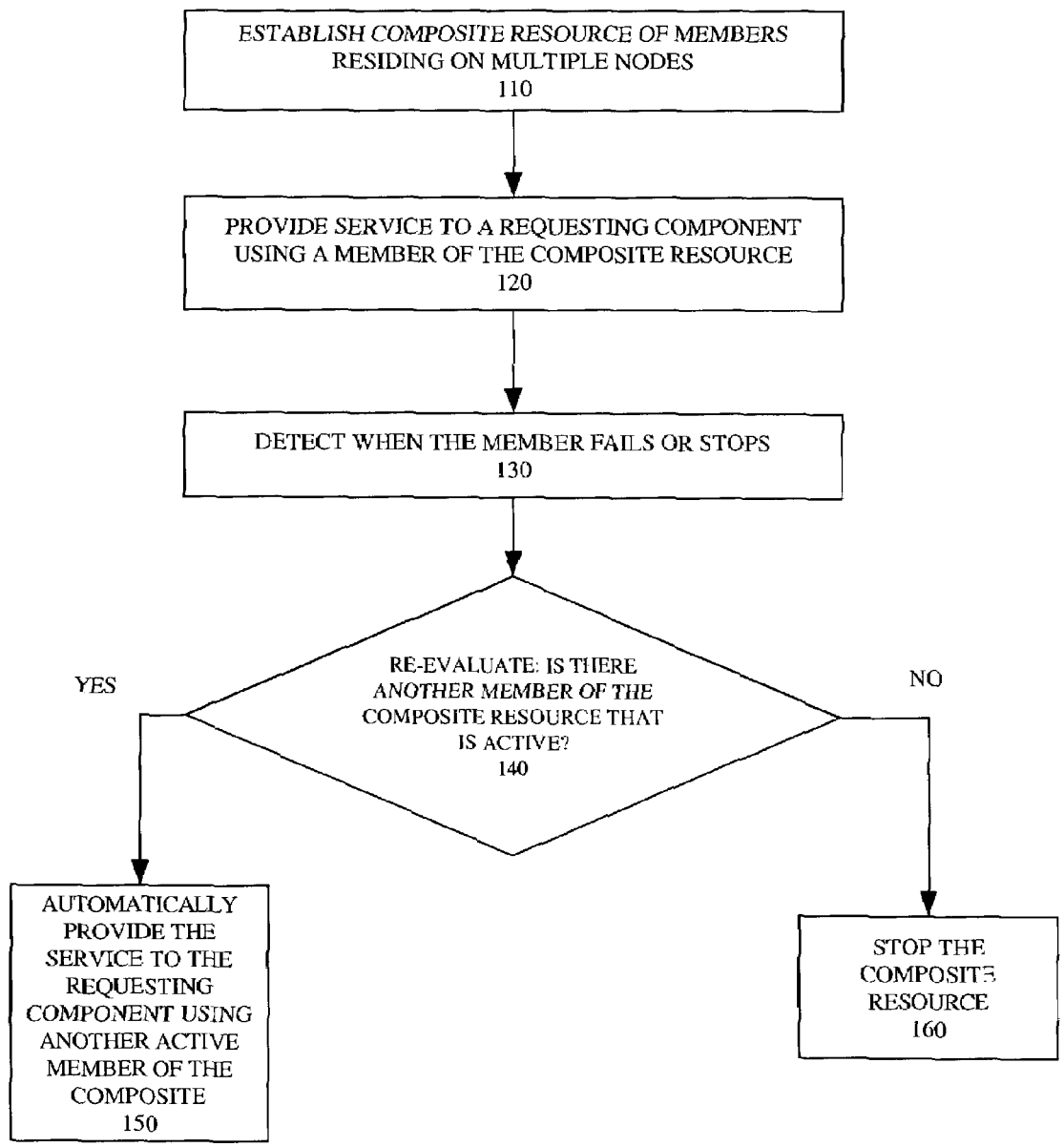
FIG. 1 describes a method for providing a service on a node cluster using a composite resource.

A method and apparatus for providing high availability of resources on networked systems is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to one embodiment, resources on a framework establish a composite resource that includes a plurality of members. Each of the members is capable of providing a comparable service. The framework agents monitor a state of each member in the composite resource. A component requests the service using resources such as the network IP address and listeners. Resources, such as network listeners, arrange for the service to be provided to the component by one or more members of the composite resource. When the particular member ceases to be active, the service is automatically provided to the component by other members of the composite resource. A state of the composite resource is maintained independently of the state of each member in the composite resource.

According to another embodiment, components are managed on a framework by establishing a composite resource that includes multiple members on a cluster of nodes. Each member is operable to provide a comparable service. A set of distributed logic resides on the cluster, and on the nodes. The logic is executable on the by the framework agents. The logic may be configured so that it continues to function upon failure of any one node in the plurality of nodes. Information is collected about a state of each member using the logic. A service level is determined for the service from the state of each of the members. The set of distributed logic arranges for the service to be provided to a requesting component by one or more of the members, until the level of the service corresponds with the service being unavailable.

In one embodiment, the distributed logic enables each of the members of the composite resource to perform actions for starting that member, stopping that member, or checking a status of the composite resource. Other actions that may be performed by the distributed logic include actions relating to a status of the member being one of enabled or disabled.

In another embodiment, events of interest are proactively provided to a high availability framework. In a framework in which a plurality of components are executing, the components are periodically polled to detect occurrence of the event of interest. A monitor is also established for one or more of the components. After a component causes the event of interest to occur, the monitor proactively communicates the event of interest to the framework without waiting for the framework to poll the first component.

In another embodiment, components are managed within a framework by establishing a composite resource from members residing on different nodes. Each of the members are capable of providing a comparable service. A message may be received by the framework to disable a member on any in the plurality of nodes. In response to receiving the message, that member is no longer available as a candidate for the composite resource. The member being unavailable may correspond to that member being off-line.

Terminology

A "composite resource" is a composition of a plurality of members that provide a common service. The service may correspond to one of many functions performed by a member. A "homogeneous" composite resource corresponds to a composite resource having nearly identical members, either by function or structure. Alternatively, a composite resource may have "heterogeneous" attributes, where differences exist in the function or structure of the members. Therefore, the service provided by each member of the composite resource need not be identical, or even equivalent.

A "member" is a resource on a node of a networked system that can be used to perform some function or service defined by the composite resource. Examples of members include applications, instances of applications, and other resources to enable and facilitate internal and external communications on a node.

As used herein, a "framework" refers to software or other logic for minimizing the delay experienced by the recipients of services provided by components within a system when those components fail. A framework may be distributed so as to be shared by multiple nodes at different locations.

The expression "substantially equivalent" means that one comparison point (quantity, function, or result) is the same or slightly deviated from another comparison point. Two resources are said to be substantially equivalent if the functions performed by the respective resources have a 90% correlation with one another.

Throughout this application, the terms "first", "second", and "third" are used as identifiers to distinguish one item from another. When these terms are used as identifiers for items, the terms do not refer to a timing sequence. For example, the terms a "first component" is meant to be a component that is different than "a second component", but not necessarily a component that is first-in-time relative to the second component. As another example, a first member may correspond to a member that is active, and a second member may correspond to a member that is a spare to one or more other active members.

Method for Using a Composite Resource to Provide a Service

In FIG. 1, a method is described for providing a service on a node cluster using a composite resource. The node cluster may be a part of a networked system that includes other devices and components. In one embodiment, the composite resource is formed by members that reside on the cluster of nodes. An example of a system that includes a composite resource on a cluster of nodes is provided with FIGS. 2 and 3.

In step 110, the composite resource is established from members that reside on the cluster of nodes. The members may be associated with one another so that each member provides a comparable service to a component that requests the service. The members may be interchangeable so that the comparable service may be provided by any of the plurality of members. The structure and functionality of the member is determined by the service being provided by the composite resource. For example, a database application service may have a composite resource that is formed by members that are instances of a database application.

In an embodiment, a service provided by a composite resource has the image of a single system. As a result, the complexity required to provide the service is hidden from a client, user or other entity requesting the service. The service allows the requesting entity to benefit from redundant parts being set up on the node cluster. The member that provides the service may be switched to another members in the composite resource transparently, even though the members may reside on different nodes.

The composite resource also enables the members to be more effectively managed when the members are providing functionality of the service. For example, the composite resource may be used to plan maintenance on a cluster of nodes, without having to individually schedule members of the composite resource. Thus, when one member or member's node is taken down for maintenance, the service provided from that node is transparently and automatically provided from another member residing on another node.

A composite resource may be established to provide various types of services. Examples of service types include a database service, a functional service, a data-dependent service, and a pre-connect service. The database service may correspond to functions performed by execution of an instance of a database server. Functional services may refer to specific functions that are grouped together when database applications are executed. Data-dependent services refer to processes that route sessions to services and resources. A particular session may declare use of a particular resource, and the data-dependent services rout the session to the location where it can receive the service. The pre-connect services correspond to applications or other resources that support other services in the event of failure.

According to one embodiment, a user provides the instructions and/or data required to establish the composite resource. The formation of the composite resource may be based on the service desired by the user. For example, the user may enter a list of instances that correspond to preferred locations where the service is to be received. The user may also specify additional instances at other locations where the service is to be provided as support. In the example, the composite resource is formed by the instances of the components used to provide the service, so that each instance is a member of the composite resource.

In step 120, the service is provided to a requesting component from one of the members in the composite resource. The requesting component may be a client terminal that is external to the nodes where the members reside. Alternatively, the requesting component may reside on one of the nodes, and require the service in order to execute. Accordingly, one embodiment provides that the selection of the member that is to provide the comparable resource may be based on the location of the requesting component. The location may be transparent to the mid-tier application or to the client terminal.

In step 130, the member providing the service is detected as becoming unable to provide the service. This may correspond to various situations. The member may fail when its node fails. Alternatively, the member may fail by itself, while the node remains operational. As another example, both the node and the member may be stopped for planned maintenance.

In step 140, the composite resource re-evaluates itself to determine its status and the status of its members. The determination may include determining whether another member of the composite resource is available to provide the service. Therefore, in one embodiment, this determination requires that at least one other member forming the composite resource is identified as being active or operational. In addition, a determination may be made as to whether the other member is available or otherwise capable of providing the service.

As an alternative, step 140 may determine whether a specified cardinality of the composite resource is satisfied once the member that was providing the service fails. While one common case assumes that the cardinality of a member on the cluster of nodes is "one", other embodiments may specify a higher cardinality. For example, the cardinality may be "three", in which case three members of the composite resource must be alive for the composite resource to be considered alive.

If the determination in step 140 is that another member forming the composite resource is able to provide the service, then step 150 provides that the requesting component receives the service from that member. In one embodiment, transition of the service being provided to one user will continue from a new location that is transparent to the user. The user may receive an interruption of services before the transfer of services to one or more other members offering the service. Alternatively, when the member providing the service fails, the service is transferred amongst other active members so that the user receives continuous service. In such an embodiment, the members of the composite resource may be homogeneous in nature. As a result, the service provided to the requesting component is not interrupted. In addition, other components on the node where the service is being provided may also depend on the service. The performance of these components is not noticeable affected when the transition is made from one member to another. Thus, embodiments such as described in FIG. 1 enable the service to be provided continuously, without delay when a transition is made between the members of the composite resource.

In the instance where the composite resource is formed from heterogeneous members, the service provided by each member may be different in quality or nature. But the common functionality that defines the service of the composite resource is provided continuously, and to the extent possible, provided transparently.

If the determination in step 140 is that no other member forming the composite resource is able to provide the service, then in step 160, the service provided by the composite resource is stopped. In one embodiment, the composite resource is only made available if a certain number or designated few members are able to restart.

System for Using a Composite Resource

Figure 2:
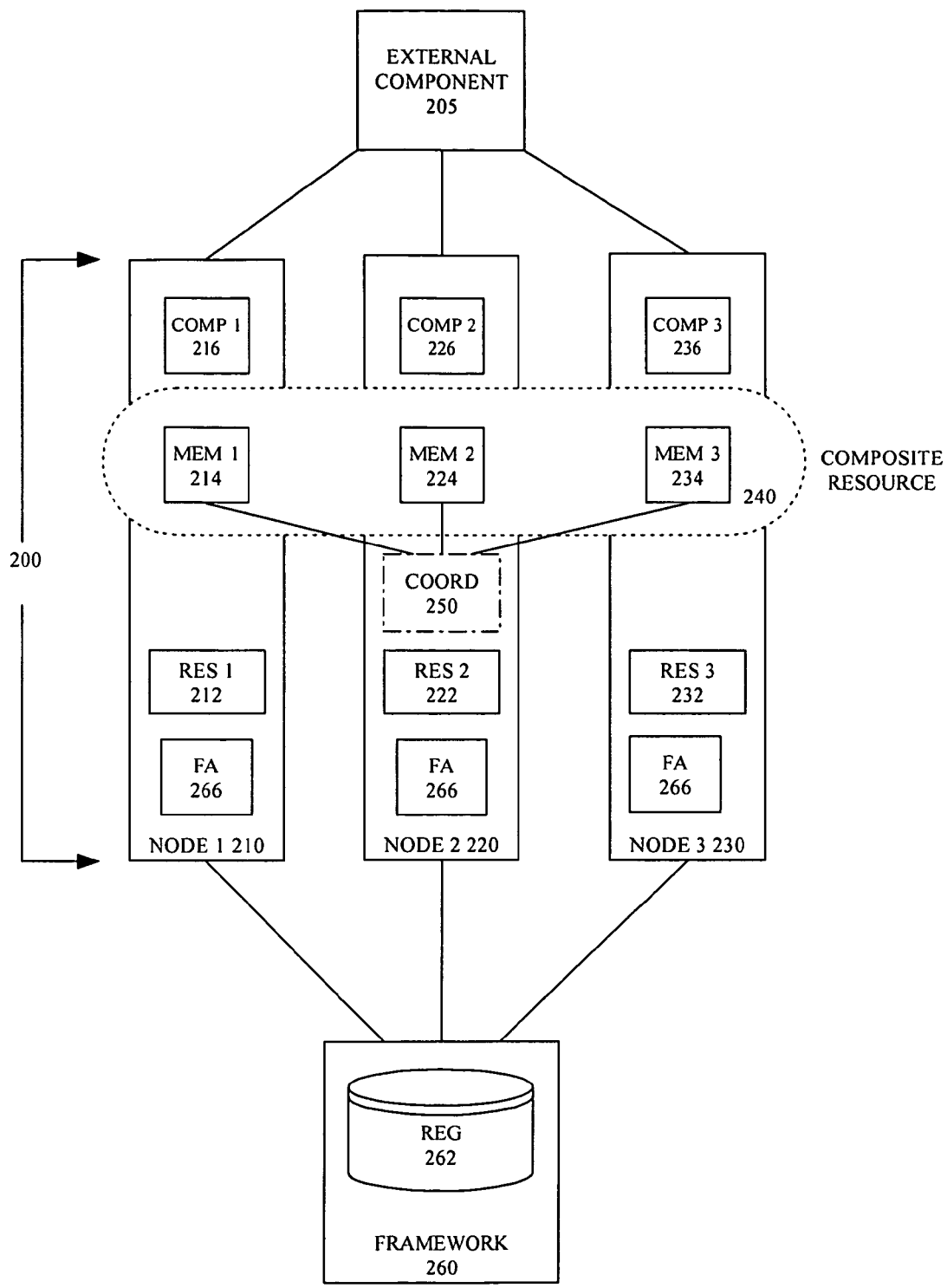
FIG. 2 illustrates a basic system for establishing and using a real composite resource on a cluster of nodes.
Figure 3:
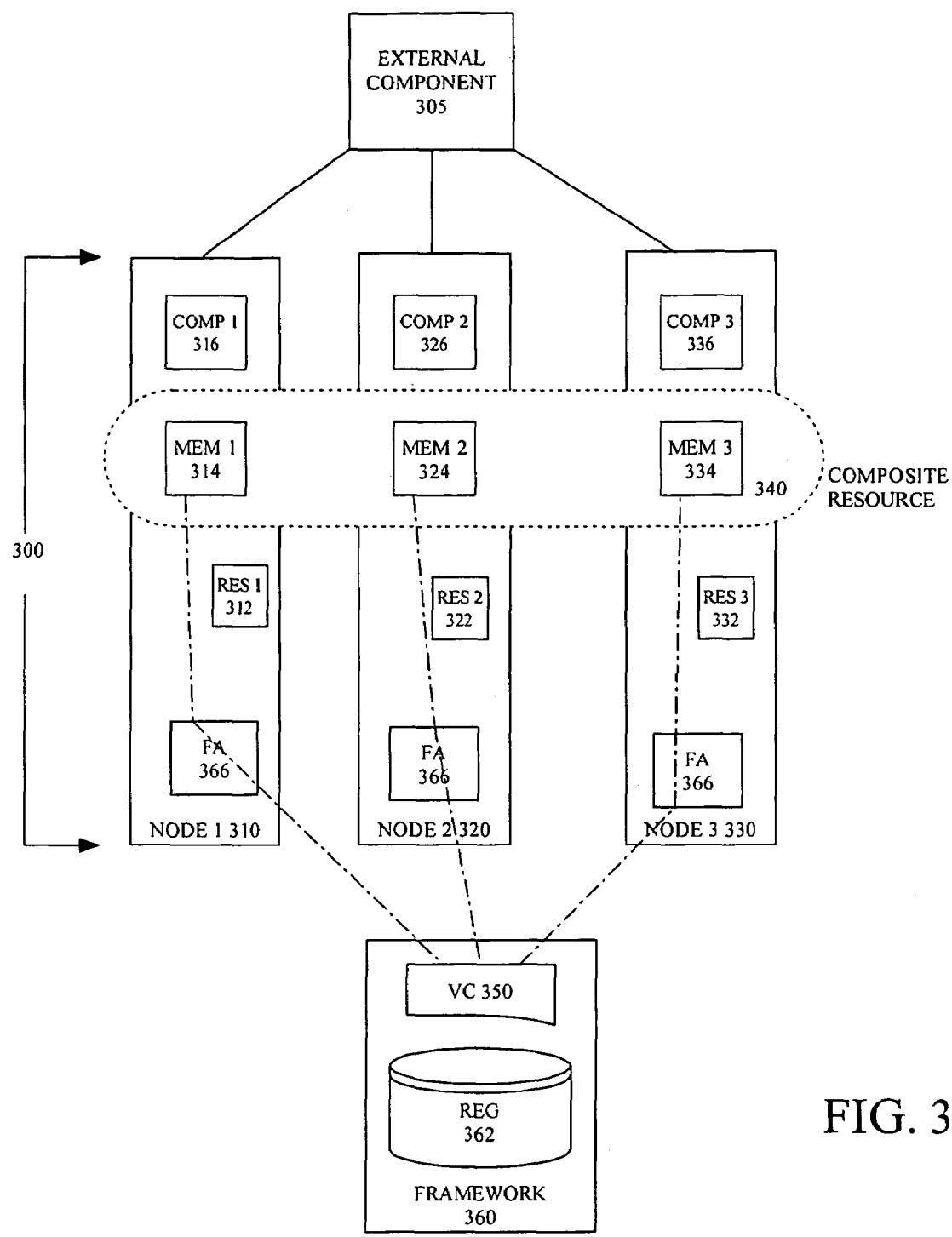
FIG. 3 illustrates another basic system for establishing and using a virtual composite resource on a cluster of nodes.

FIG. 2 illustrates a basic system for establishing and using a real composite resource on a cluster of nodes. The composite resource provides a service for other components, which may reside either internally or externally to the node cluster. In an embodiment such as described with FIG. 2, the composite resource is said to be "real" in that the composite resource has a physical dependence on at least one of the nodes in the cluster. Other embodiments, such as described with FIG. 3, provide for a composite resource that is "virtual", in that the composite resource has no physical dependence on any individual node.

In an embodiment, a system 200 includes a first node 210, a second node 220, and a third node 230. The first node 210 includes a first resource 212, a first member 214, and a first component 216. The second node 220 includes a second resource 222, a second member 224, and a second component 226. Likewise, third node 230 includes a third resource 232, a third member 234, and a third component 236. The first member 214, second member 224, and third member 234 may be established to form a real composite resource 240.

In an embodiment, the system 200 includes a first node 210, a second node 220, and a third node 230. The first node 210 includes a first resource 212, a first member 214, and a first component 216. The second node 220 includes a second resource 222, a second member 24, and a second component 226. Likewise, third node 230 includes a third resource 232, a third member 234, and a third component 236. The first member 214, second member 224, and third member 234 may be established to form a real composite resource 240.

A framework 260 exists on each of the first node 210, second node 220, and third node 230. While framework 260 is illustrated as being in the form of partitions residing on different nodes, one embodiment provides that the framework 260 may form a single logical entity that exists on all of the nodes. The framework 260 may exist on each node in the form of framework agents 266, which perform the functions on behalf of the resources at the local nodes. The framework 260 may include functionality to restack applications and resources of failed nodes on other nodes. In an embodiment, the framework 260 executes code to establish the composite resource 240 and to provide services to other components. A registry 262 may be used by framework 260 and/or coordinator 250 to store state information about the members of the composite resource 240. This state information may indicate whether a member of the composite resource 240 is active or non-active. The registry 262 may be part of the framework 260, or alternatively, the registry may reside external to the framework.

Real Composite Resource

In a system such as described in FIG. 2, the composite resource 240 is considered to be "real" because the composite resource is viewed by the framework 260 as directly operating and being dependent on one of the nodes in the system. The particular node that the framework 260 views as the location of composite resource 240 is arbitrary, and may change several times over the course of the composite resource 240 being in operation. Thus, the nodes 210, 220 and 230 are equal in that either one of those nodes may be viewed as containing the composite resource 240 at a particular moment.

In FIG. 2, the manner in which the composite resource 240 is viewed as having a presence on one of the nodes is illustrated by a coordinator 250. In one embodiment, coordinator 250 is actually code that executes on the framework 260 in order to evaluate the composite resource 240. The composite resource 240 may actually be a representation of framework agents and resources that are distributed amongst all of the nodes. But when the framework 260 executes instructions corresponding to functions that are to be performed by the composite resource 240, the functions (as well as the composite resource 240) are viewed as being performed on one node.

Thus, the "real" composite resource 240 is node-independent, and the particular node that the composite resource is dependent on may be arbitrarily determined and subject to change. If at a particular time, the node viewed as where the composite resource 240 resides fails, the composite resource is restarted transparently on another node. The members of the composite resource 240 may remain in operation to function outside of the composite resource 240 with no change to the service. The composite resource 240 is re-started and re-evaluated based on the members that are in operation.

For purpose of this application, the coordinator 250 refers to framework resources, such as framework agents 266, which execute to perform the coordinating activities for all resources in the framework. As will be described in greater detail below, these functions include starting members to provide the service, stopping members from providing the service, recovering the composite resource 240, and relocating particular composite resource jobs of a member that fails to the other members of the composite resource 240. When, for example, the member providing the service to component 205 fails, the coordinating activities arrange for one (or more) of the other members to provide the same service to that component.

In FIG. 2, the coordinator 250 is described as residing on one node to illustrate the point that the "real" composite resource 240 may be dependent on one of the nodes in the cluster where members of the composite resource 240 reside. The node of the coordinator 250 may be assumed to correspond to the node where the composite resource 240 is viewed as residing by the framework 260. As mentioned, the particular node where the composite resource 240 is viewed as residing on is randomly selected and subject to change. Accordingly, the position of the coordinator 250 should not be viewed as an indication that one node is more important than another node.

One reason why the framework 260 may treat the composite resource 240 as having a physical presence on one of the nodes is the framework's own existing limitations. These limitations may preclude the framework 260, in some instances, from dis-associating the functions performed by the composite resource 240 from anyone particular node. Thus, an embodiment described by FIG. 2, illustrating the coordinator 250 as having a location on one node, accounts for such possible limitations of the framework 260. An embodiment such as shown by FIG. 2 is effective in continuously providing the service of the composite resource 240 provided that the particular node where the composite resource is viewed as residing at a particular instance by the framework 260 does not fail. If such failure occurs, the composite resource 240 may have to be recovered. The process of recovery may include re-starting the composite resource 240, and re-evaluating the composite resource to determine a status of its individual members. But in most cases, there are many nodes that provide members for the composite resource 240. Since all of the nodes may be viewed as being where the composite resource 240 resides, the occurrence of one node failing and thus causing the composite resource 240 to stop is uncommon.

The composite resource 240 accounts for the limitations of the framework 260 while providing many features to improve performance and usability of its members. For example, members operating within the composite resource 240 may provide automated framework operations and transparent load sharing topologies. Other services that may be provided as a result of the composite resource 240 include connection and runtime workload management for the many clients that can be serviced with the composite resource. The composite resource also facilitates providing additional capacity on demand. For example, the cardinality of the composite resource 240 may automatically be increased in response to certain preconditions on the amount of work being performed by the composite resource. The work that can be performed by the composite resource may also be commoditized.

Coordinator

As mentioned, the coordinator 250 represents framework resources and agents that perform coordination activities. In one embodiment, the coordinator 250 may also include resources of the members of the composite resource 240, which perform such coordination activities instead of or in addition to the framework resources. In one embodiment, the coordination activities include starting individual members of the composite resource 240, stopping the individual members, and recovering individual members of the composite resource 240. The manner in which the composite resource is recovered may be according to a predetermined protocol that for example, re-starts the service of the composite resource 240, and re-evaluates the status of the composite resource members.

In one embodiment, the load management software arranges for a particular member of the composite resource 240 to provide the service to an entity requesting the service. When the member providing the service ceases to provide the service(i.e. member or node failure), the coordinator 250 arranges for another member in the composite resource 240 to provide the service to that entity. All active members of the composite share the workload at runtime and rebalance workload at recovery and at repair for the components that were receiving the service from the failed member.

Whenever a member of the composite resource stops or fails, the composite resource is re-evaluated. Members of the composite resource 240 continue operations outside of the composite resource until the composite resource is re-evaluated. Functions for recovering the composite resource 240 are performed by resources of the framework 260 and/or the framework agents 266. The recovery of the composite resource 240 is performed by individual members, particular framework resources, and/or other resources that are not part of the set of resources using to perform the coordination activities.

In an embodiment, the coordinator 250 arranges for the service to be provided to a requesting component that resides on one of the nodes. Alternatively, the requesting component may correspond to an external component such as client component 205. The coordinating activities executed by the framework agents 266 are active as long as the composite resource 240 is available. The resources used in providing the coordinator 250 may also be used to provide an interface for an administrator to interact with the composite resource 240 and its members 214, 224, 234.

As one example of system in operation, first component 216 requests the service being provided by the composite resource 240. The request from first component 216 may be made to resources represented by coordinator 250. The coordinator 250 arranges for first member 214 to provide the service. Since first component 216 resides on first node 210, the coordinator 250 may arrange for the service to be provided to the first component 216 by first member 214, although the service may be provided to the component 216 from any of the other members forming the composite resource. To provide the service, the first member 214 may depend on use of first resource 212. For example, first resource 212 may correspond to an interface, or a lower-tiered application for communicating with other computers or to the database.

According to one embodiment, a system as described in FIG. 1 provides availability of the service when a member of the composite resource 240 ceases to provide the service. If first member 214 fails, another member of the composite resource 240 may provide the service in a comparable fashion to the first member. The first component 216 may transparently switch to receiving the service from the another member, without noticeable interruption in receiving the service. The quality of level of the service provided by the other member may be of a comparable or equivalent level. Thus, if first member 214 fails, coordinator 250 may automatically arrange for second member 224 to provide the service to component 216.

The failure that results in the service switching from one member to another may be because the entire node failed. The failure may also be isolated to the member failing, while the node remains operational. In addition, the resource of the node may fail, so that the composite resource 240 is unable to operate.

In an example such as described with FIG. 2, the type of failure shown is only the first member 214 failing, while node 210 and first resource 212 remain operational. In response to detecting the failure, the coordinator 250 automatically arranges for the service to be provided to the first component 216 from second member 224 on second node 220. The switch is transparent, in that the recipient of the service is not aware of a new location from where the service is being provided. However, it is possible for the recipient's components to receive an interruption. The interruption may on a lower level of network activities, so that the effect of the interruption to the user is transparent.

In one embodiment, second member 224 uses the second resource 222 to provide the service, where the second resource provides a comparable function as first resource 212. In such an embodiment, there may be a local dependency between the member 224 and the second resource 222. But it is also possible to have a global dependency, where the member 224 is on one node, but functions of second resource 222 are provided from another node.

Managing Resources that are Dependent on the Service

In one embodiment, the first component 216 is dependent on the service provided by the composite resource 240. The first component 216 may be a "weakly dependent" application that requires the service of composite resource 240 to start, but does not require the service for its subsequent execution. As a result, first component 216 may request the service from the composite resource 240 each time a request to start the first component 216 is received.

As another example, the component requesting the service may be client component 205, which is external to the nodes where the members reside. In this example, the first component 216 may correspond to an application that is dependent on the service provided by the composite resource 240. The client component 205 may require use of the service, along with functions provided by first component 216.

If there is member failure on first node 210, and first component 216 is dependent on the service of the composite resource 240, then first component 216 may be stopped, or otherwise inactive. The service may be provided to the component 205 from any other node where the service is supplied. For example, the service may already be available from the second member 224, so that the coordinator 250 may arrange for the second member to provide the service to the particular component that was receiving the service from the first member 214. Thus, service of the composite resource 240 may be provided to the component 205 from the second member 224 on second node 220. In fact, all of the jobs performed by the first member 214 as part of the composite resource 240 may be distributed to the other members equally once the failure to first member 214 occurs. Either the first resource 212 or the second resource 222 may be used by the second member 224 as it provides the service to component 205. If second component 226 is needed by client component 205, and second component 226 is dependent on the service, then the second component 226 is executed after the service is started on second member 224.

If the first component 216 is weakly dependent on first member 214, or if the first component is independent of first member 214, the first component 216 may be maintained operational on first node 210 when the first member fails. The first resource 212 is not dependent on first member 214, so it may also remain in operation for use with other applications or components of first node 210 when there is member failure.

In the event the failure is that of the first node 210 failing entirely, the work performed by the first member 214 is shared amongst the other active members of the composite resource 240. The service for the client component 205 may continue to be provided after the first node's failure by causing the second member 224 on second node 220 to provide the service to the client component 205. The second member 224 uses the second resource 222 to provide the service. If second component 226 is needed, it too can start performing work for use in providing the service to the component 205. Other resources may be started as necessary on second node 220. The order in which the other resources are started is based on the dependency established between the resources on second node 220, including between the composite resource 240 and the other resources of the second node.

In the event of a second failure of second node 220 or the second member 224, the load management software arranges for the work performed by the second member to be distributed to the other active members of the composite resource 240. In an example provided by FIG. 2, all work performed by the first member 214 and second member 224 may be performed by third member 234 of third node 230 once the first and second members fail. In an embodiment, the failure of any one member in the composite resource 240 causes the composite resource to be re-evaluated. The re-evaluation may be performed by resources represented by coordinator 250, or by other resources on the framework 260 or with the members of the composite resource 240. Recovery of the composite resource 240 may be initiated when the composite resource 240 fails as a whole. In one embodiment, this corresponds to when no other member remains alive to provide the service. In another embodiment, a minimum cardinality is specified for the composite resource, and as long as the number of active members satisfies the cardinality, the composite resource is considered to be running.

In one embodiment, initiating recovery of the composite resource 240 may require verifying that each member 214, 224, and 234 is stopped. Initiating recovery of the composite resource 240 may require that each member 214, 224, and 234 that forms the composite resource is started. Alternatively, initiating recovery for the composite resource 240 may require verifying that a specified cardinality for the composite resource 240 is satisfied by the number of members that have started. The members that are started may start on their own, or through some action from another resource associated with the composite resource 240. According to one embodiment, the members recover independently and the composite resource is re-evaluated each time one or more members fail and/or recover. The composite needs no recovery (unless the physical node it is running on fails.)

Virtual Composite Resource

FIG. 3 illustrates another embodiment in which a system 300 is configured to include a virtual composite resource for providing a service. Similar to the real composite resource described with FIG. 2, a system is described where a virtual composite resource 340 provides a service for entities that reside internally or externally to a cluster of nodes. One characteristic of the virtual composite resource is that it has no physical dependence on any one node. Rather, the virtual composite resource distributes processes, in the form of logic or software, on the various nodes equally, without any treatment from the framework or other component that the composite resource has a physical location on one of the nodes. The processes are distributed so that the processes are still executable upon failure of any one of the nodes in the cluster. Thus, an embodiment where a virtual composite resource is used addresses the physical limitations of the real composite resource, while offering the same basic functionality and features.

In an embodiment, the system 300 includes a first node 310, a second node 320, and a third node 330(representing an nth node). The first node 310 includes a first resource 312, a first member 314, and a first component 316. The second node 320 includes a second resource 322, a second member 324, and a second component 326. Likewise, third node 330 includes a third resource 332, a third member 334, and a third component 336. The first member 314, second member 324, and third member 334 form a virtual composite resource 340.

Framework agents 366 reside on each of the first node 310, second node 320, and third node 330. The framework agents 366 communicate with a framework 360. A registry 362 is provided with the framework 360. The registry 362 is accessible to the framework agents 366. The framework agents 366 allow for the framework 360 to be considered as a single logical entity that spans the nodes where the members of the composite resource 340 reside.

Virtual Composite

In FIG. 3, logic for performing the coordination activities is shown by a virtual composite manager (VC) 350 that resides on the framework 360. The VC 350 is only a representation of the processes, resources and logic for performing management and/or coordination activities for the composite resource 340. The VC 350 is shown to reside on the framework 360, but it is possible for code used to execute the VC to reside on the nodes. In one embodiment, the VC 350 is executable on the framework 360, or by framework agents 366, equally by all nodes. Furthermore, the virtual composite resource 340 is not viewed by the framework 360 as being located on any one node, so that the virtual composite resource 340 may be operated independent of the nodes. However, the VC 350 may in fact comprise code that is executed by the framework 360, framework agents 366 and/ or composite resource members. The failure of one node in the cluster will not affect the activities and functions performed by the resources that comprise VC 350.

Functions performed by resources that comprise VC 350 include assisting or managing member functions. The member functions may include a member being restarted after a failure. The VC 350 may also re-evaluate the composite resource based on a status of its members. The re-evaluation may be done in response to one of the members failing. The VC 350 may trigger recovery of the composite resource 340 when the members of the composite resource 340 fail. The VC 350 may also relocate work or jobs performed by one member to one or more other members of the composite resource 340.

In one embodiment, VC 350 executes code to collect state information about the members 314, 324 and 334, as well the corresponding nodes 310, 320, and 330. The VC 350 may collect state information when the state of one of the members 314, 324 and 334 changes. The state information may indicate whether any of the members 314, 324 and 334 are alive, or whether a particular one of the members has ceased providing the service because of failure. The state information may be collected in registry 362, which can be located internal or external to framework 360. Because VC 350 is executable on the framework 360 from all of the nodes, the VC is insulated against failure of a particular member of the composite resource 340, regardless of whether the node failure is attributable to the node or to the member.

The composite resource 340 may be configured for use on the system by user-input. Input from an administrator or other user may specify configuration information for the composite resource 340. The configuration data may be used to declare the composite resource 340 when the framework 360 include preexisting processes to establish the composite resource 340, and to execute VC for that composite resource. As a result, one embodiment provides that an administrator can establish and manage the composite resource 340 by entering configuration data, without having to provide any code.

The operations of composite resource 340 and VC 350 are similar to that described in FIG. 2 for the real composite resource 240. One difference is that in FIG. 2, the composite resource 240 is disabled should the node where coordinator 250 resides fail. In a system described with FIG. 3, the failure of any one node, or even some of the nodes in the cluster, does not disable the composite resource 340. As a result, the virtual composite resource 340 is more reliable.

When a request for a service of the composite resource 340 is made, the VC 350 arranges for one of the members 314, 324, 334 to provide the requesting component the service. Thus, as shown in FIG. 3, in response to first component 316 requesting the service, VC 350 arranges for first member 314 to provide the service. When first member 314 fails, the VC 350 arranges for the second member 324 to provide the service. If the composite resource 340 is dependent on one of the resources 312, 322, 332 to provide the service, the VC 350 may provide for the second member to use either first resource 312 or second resource 322.

In the case where there is node failure, the resources represented by the VC 350 arrange for the service to be provided from the second member 324 on second node 320. An external component 305, such as a client, may receive the service from the second member 324 if node or member failure occurs. If, for example, first component 316 is dependent on the composite resource 340 and first member 314 fails , the service may be provided to the first component by second member 324. Alternatively, the functionality provided by first component 316 on first node 310 may be replaced by second component 326 on second node 320.

The composite resource 340 facilitates use of models that simplify configuration and use of the individual members that form the composite resource. More specifically, the distributed logic provided by the composite resource 340 facilitates the use of concepts of "anonymity" and "cardinality" in enabling users to use and configure the composite resource. Both anonymity and cardinality are described in greater detail below. While the concepts of anonymity and cardinality are described in the context of the virtual composite resource 340, the concepts may also be implemented on a real composite resource such as show in FIG. 2. But the concepts are facilitated with virtual composite resource 340 because its members are not dependent on any particular node to coordinate the service amongst the members, so that all nodes may be treated equally for purpose of providing availability. Members operating on those nodes need only be identified by their association with the composite resource 340 and by the particular address or identification of the node where that member resides. Both anonymity and cardinality favor allowing the user or administrator to address the composite resource as a whole, without need for individual member identification.

Anonymity

According to one embodiment, anonymity is achieved by allowing components that use the services of a composite resource (whether "real" or "virtual") to use those resources without having to know the exact identify of any individual member in the composite resource. Anonymity enables the user or administrator of system to more easily manage members of composite resource 340. Anonymity is further enhanced in the virtual composite model because the members 314, 324 and 334 are not required to have unique name identifications, at least to a user or administrator. Also, members 314, 324, 334 are not required to be individually addressable. For example, an administrator does not have to individually address each node when seeking to implement a particular configuration for the composite resource 340.

According to one embodiment, the user or administrator identifies members of the virtual composite resource 340 by their association with the composite resource. For example, an instruction to configure the composite resource 340 may specify a particular service, and this would be sufficient to apply the instructions to a specific member that provides the service. This is in contrast to more traditional ways of managing each application, including the members of the composite resource 340, using a unique identification and by address.

Anonymity may be achieved by declaring a resource, such as an application or instance, as a "local" resource. A resource that is "local" may belong to a set, and the resource may be identified by the name of the set and an identification of the node where the local resource resides. For example, a set of resources may correspond to multiple instances of an application, and the instances may be identified by application name.

In a system where numerous members exist, the administrator's task of managing the members becomes labor-intensive, as the administrator is required to manage the members by specifying each member's identification and address. But anonymity enables the administrator to manage the application by specifying the composite resource (rather than its individual members) and the node where the member of interest resides.

In an embodiment, the framework 360 may be configured to include mapping logic that maps unique node identification and address information to the composite resource 340 and the addresses of nodes that support the composite resource. This simplifies the manner in which the administrator manages the members of composite resource 340.

Therefore, in a system such as shown by FIG. 3, a local resource may be defined by a single identification, and implanted cluster-wide on some or all of the nodes that form the composite resource 340. In this way, the members may be individually operated, configured or otherwise managed simply by identifying the composite resource 340 and the node where that member resides. This solution is in contrast to how resources are currently managed in node clusters, where each resource is identified by its own unique identification and by the identification and/or address of its node and its infrastructure.

Cardinality

According to one embodiment, cardinality refers to the number of active members of a composite resource. When the particular members of a composite resource are not more important than others, the cardinality of the composite resource is sufficient to specify one level of service provided by the composite resource.

In another embodiment, cardinality may be measured by some performance criteria. For example, the cardinality may correspond to the service time provided by the virtual composite resource 340.

In one embodiment, cardinality is used to determine whether a minimum service level is being provided by a composite resource. For example, an administrator may specify that the composite resource is considered to be alive as long as the number of members that are alive is equal to or greater than "one", or some other number.

In another embodiment, cardinality may be used during the configuration of the composite resource 340. For example, the administrator may configure the composite resource 340 by specifying configuration information that is to be implemented on a designated number of members.

As another example, cardinality may be used to expand services provided by the composite resource 340. A designation of the cardinality may be increased in order to increase the work performed by the composite resource 340. An administrator may use the designation of the cardinality without specifying any information about the particular members or nodes providing the service. Thus, cardinality and anonymity may facilitate each other.

Managing Composite Resource Members Based on Service Level

Figure 4:
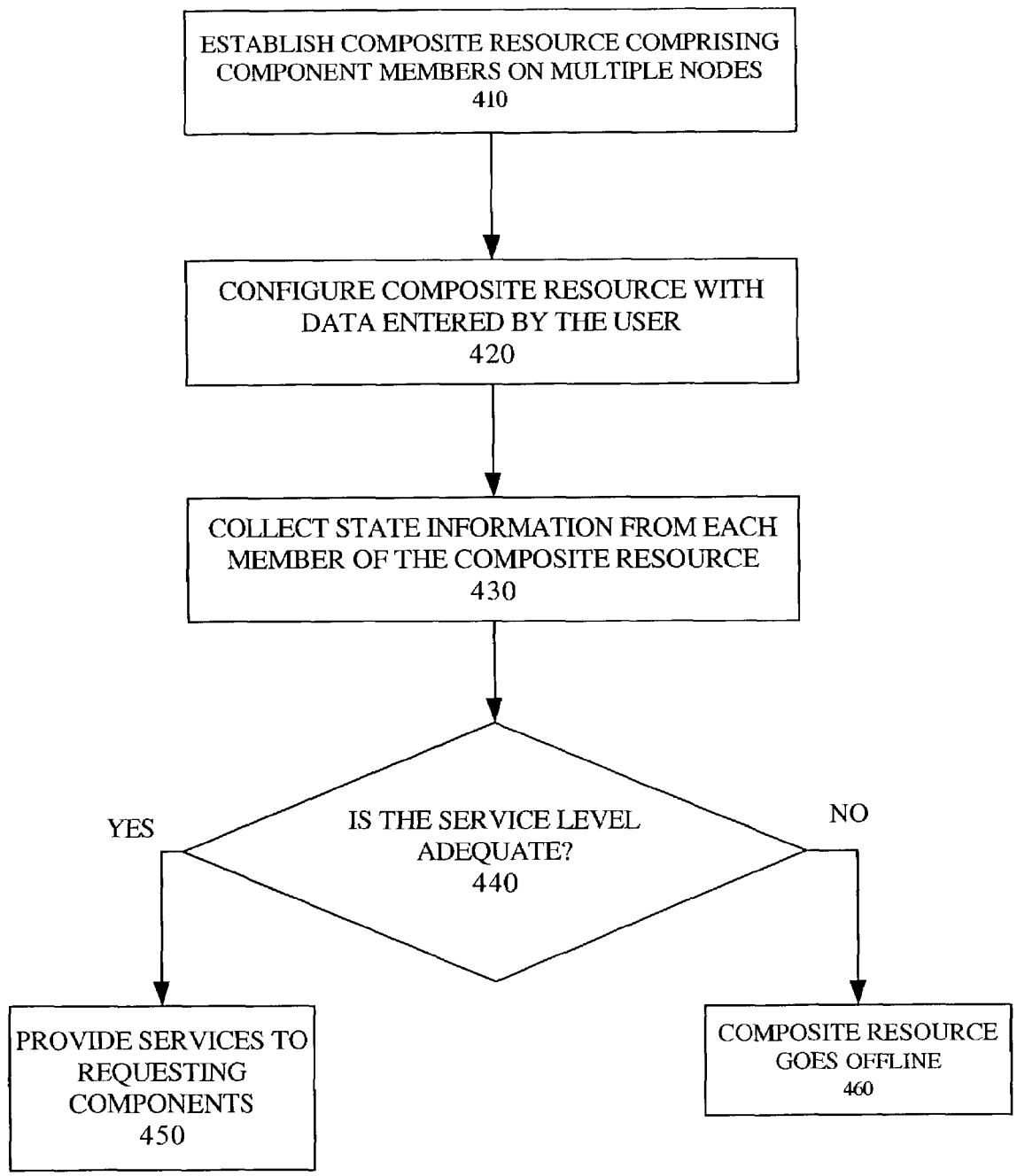
FIG. 4 illustrates a method for managing a plurality of members of a composite resource based on service level.

FIG. 4 illustrates a method for managing a plurality of components of a composite resource based on service level. A method such as illustrated by FIG. 4 may be implemented on a system such as shown by either FIG. 2 or FIG. 3. For purpose of illustration, reference is made to elements of FIG. 3 when describing the steps of the method.

In step 410, composite resource 340 is established using the members 314, 324 and 334 residing on node 310, 320, and 330 respectively. Each member forming composite resource 340 is capable of providing a comparable service. The composite resource 340 may be homogeneous, in that each member 314, 324, and 334 provides substantially equivalent services. Alternatively, the composite resource 340 may be heterogeneous, or have heterogeneous attributes that may correspond to a difference in the quality of service, or the manner which the service is performed.

In step 420, the composite resource 340 is configured by data entered by the administrator. In one embodiment, the configuration may specify a service level for the composite resource 340. Specifically, the configuration data may specify the cardinality of the composite resource 340, the overall service level measured by the service time, or the overall service level measured by throughput, or some other characteristic. Still further, the configuration data may specify other information about how the composite resource 340 and its members 314, 324 and 334 are to operate or recover. For example, the configuration data may specify the dependencies (weak and strong) that are to be assumed as existing with respect to what resources the composite resource 340 requires, as well as which components require composite resource 340.

Step 430 provides that state information is collected from each of the members 314, 324, and 334 of composite resource 340. This step may be performed by executing a check action for the composite resource 340. The state information may be collected by the logic elements or processes that forms VC 350. For example, each node may contain logic as part of the VC 350. That logic may collect state information about the member on that particular node. The state information may be stored in registry 362. In one embodiment, the state information corresponds to whether a particular member is alive or ceased operations. The state information may also be collected in response to a particular member changing state.

In step 440, a determination is made to compare a service level of composite resource 340 to a designated level that corresponds to the composite resource 340 being inactive. In one embodiment, the designated level is specified by the administrator. For example, the service level may correspond to a user-specified cardinality, where the number of operational members must be equal to or exceed the cardinality. As another example, the service level may correspond to a percentage or ratio of the maximum service quantity that can be performed by composite resource 340.

If the determination in step 440 is that the composite resource 340 is available, then in step 450, the VC 350 arranges for the service to be provided to a requesting component by one or more of the members in the composite resource 340. The service is provided until the level of the service is determined to correspond to the service being unavailable. As long as the service exceeds the designated level, the VC 350 ensures that at least one of the members 314, 324, 334 is providing the service of the composite resource 340 to a requesting component. If the member arranged to provide the service fails, then the VC 350 may arrange for another member that is active to provide the requesting component the service. As previously described, the transition of the members may performed seamlessly, so that the switch between members is not determinable from the perspective of the requesting component.

If the determination in step 440 is that the composite resource 340 is not available, then the composite resource 240 goes off-line. The members may be restarted, which causes the composite resource 340 to be re-evaluated. Thus, the composite resource 340 will exist as a function of the members existing.

As an alternative, the composite resource 340 may be expanded to provide additional services that would make the composite resource 340 available. For example, a cardinality of the composite resource may be expanded. For example, the composite resource may establish a set of inactive members that serve as spare nodes for the active members of the composite resource 340. In the event that services of the composite resource 340 are to be expanded, the resources of the VC 350 activate one or more members from the spare or inactive members.

Monitoring Events of Interest

Figure 5:
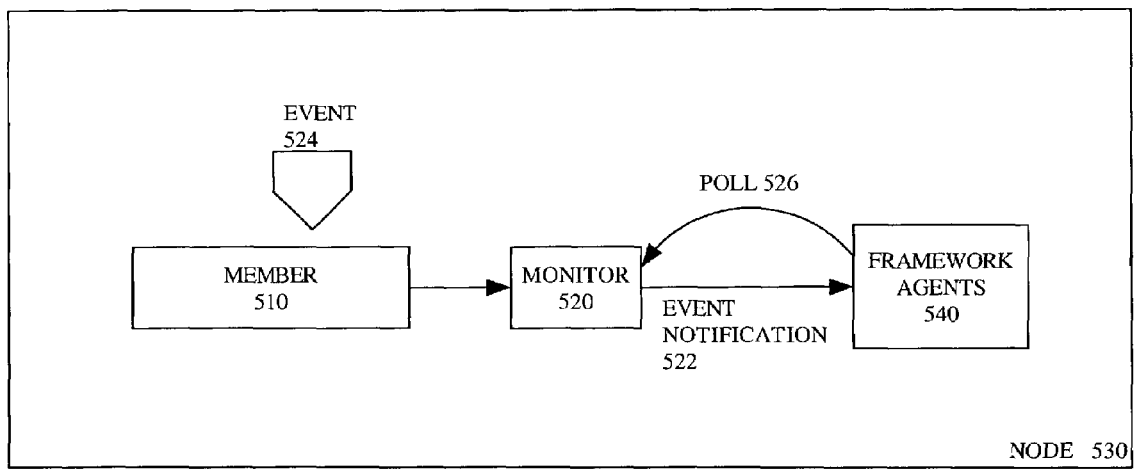
FIG. 5 illustrates a system that is configured to immediately detect events of interest.

FIG. 5 illustrates a system that is configured to immediately detect and proactively communicate to the framework events of interest. A system such as illustrated with FIG. 5 may be implemented with systems illustrated in FIGS. 2 and 3. Reference to elements of FIG. 3 are intended to illustrate exemplary components for practicing an embodiment such as described by FIG. 5.

A system 500 includes an application instance 510 that executes on a node 530. The node 530 includes framework agents 540 which communicate with a framework shared by the cluster of nodes. According to an embodiment, a monitor 520 is associated with the application instance 510 to detect events of interest immediately after the events occur. The monitor 520 communicates an event notification 522 when an event of interest 524 occurs. The framework agents 540 perform a poll operation 526 on the application instance 510 at predetermined intervals, in order to determine the state of the application instance. The event of interest 524 may change the state of the application instance 510, so that the occurrence of the event may cause the monitor 520 to provide the framework agents 540 the same information that it would have otherwise acquired through polling. Thus, the poll operation 526 and the monitor 520 may perform overlapping functions. The redundancy ensures the system 500 is reliable. It may be learned during operation of node 530 that the monitor 520 is reliable for the application instance 510, in which case polling can be replaced entirely by the event system and application level monitors. Otherwise, polling and monitoring may be used together to make detection of events of interest fast and reliable.

In one embodiment, the events of interest cover the states utilized by framework agents 540. Accordingly, an event may correspond to the following: (i) when the application instance 510 starts; (ii) when the application instance 510 is relocated to another node; (iii) when the application instance 510 is stopped, but not failed; (iv) when the application instance 510 is stopped and failed; and (v) when the application instance is checked to be operational. Detection of one of these events may initiate the framework agent 362 to perform some action. The action may also trigger VC 350 to perform one of its activities, such as initiate check or initiate recovery.

In a configuration such as shown by FIG. 3, monitor 520 is established for each member 314, 324, 334. The monitor 520 detects when, for example, the first member 314 ceases, or is about to cease, providing the service of the composite resource 340 in response to a request from another component. The event notification 522 sent from monitor 520 communicates the failure to framework 360. In response to being provided the communication, VC 350, which resides on framework 360, arranges for the second member 324 in the composite resource 340 to provide the service.

The selection of which member is to provide the service may be executed by framework agents 540, executing as part of the VC 350. In the event of member failure, the selection of which member is to provide the service for a particular job is determined according to recovery policies. The state of each member may be based on whether that member has started for another component (and thus not available), failed, stopped but not failed, checked to be alive, or relocated.

Some or all of the state information may alternatively be acquired through the poll operation 526 of the framework agents 540. It is possible for monitors 520 to not always be reliable. For example, the monitor 520 may fail with the application instance (e.g., a member) 510 or with the node. In such cases, the framework agents 540 performing the poll function may provide a reliable backup.

Enable/Disable Feature

The members of a composite resource are subject to planned and unplanned failures. The planned failures may be performed for maintenance. Unplanned failures may occur when a member fails, or when it is dependent on another resource that has failed. In such cases, it is beneficial to take the member out of the system. In a system such as described with FIGS. 2 and 3, it is beneficial to take the member out of the control of the framework. This means that the member should not be able to restart automatically when it fails. Rather, the member should remain disabled until corrective action is taken to repair the member or the resources that is depends on.

Figure 6:
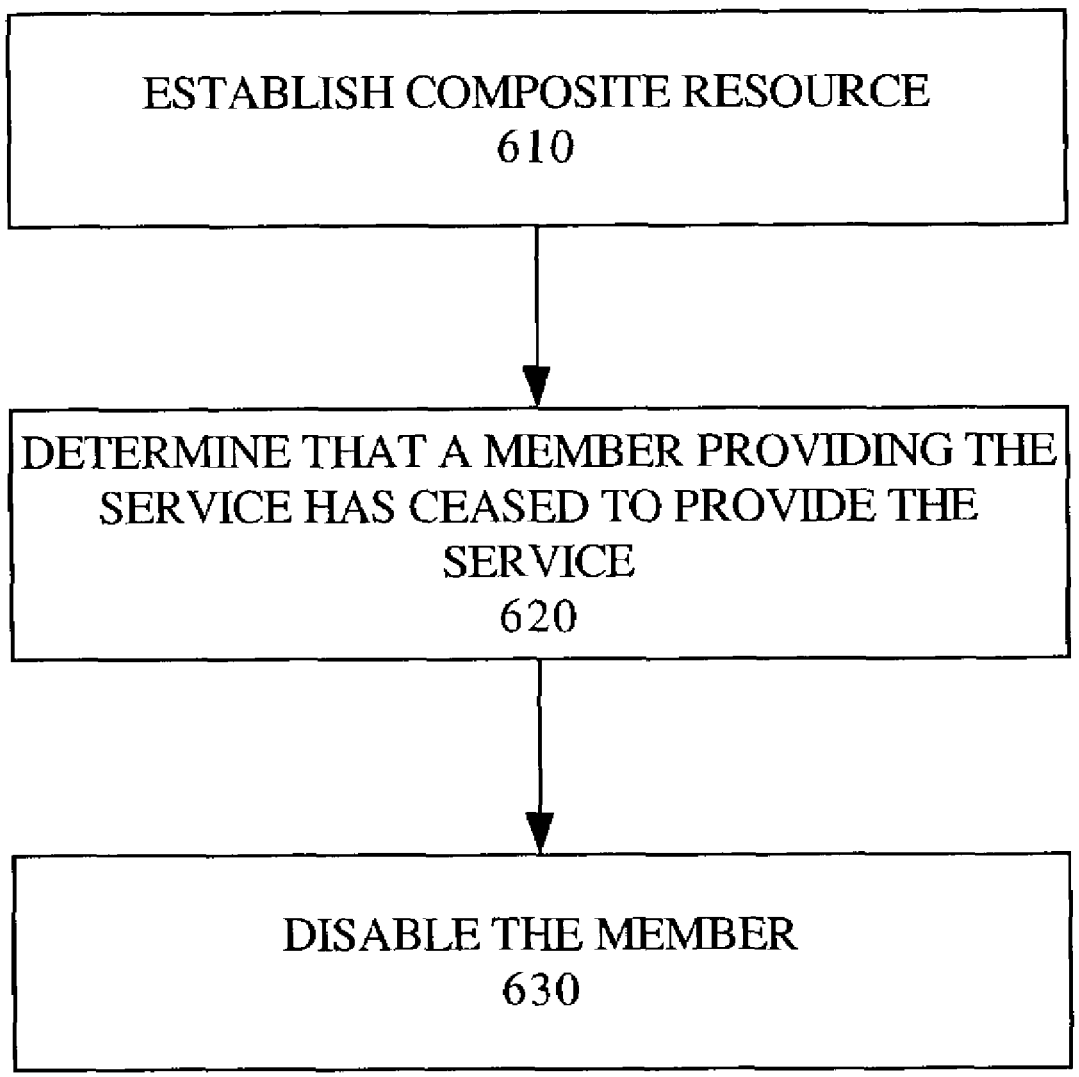
FIG. 6 illustrates a basic technique for managing a composite resource when a member fails.
Figure 7:
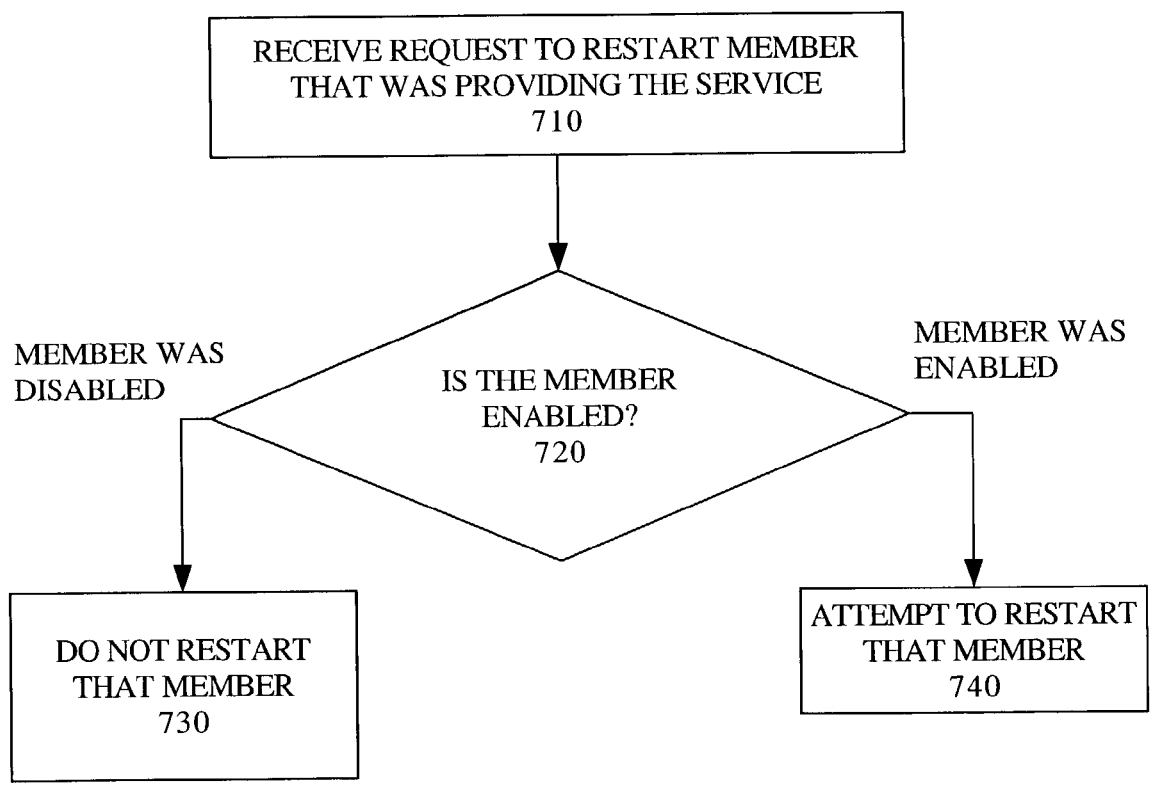
FIG. 7 illustrates another technique for using the composite resource after a node is disabled.

FIG. 6 illustrates a basic technique for managing a composite resource when a member fails. FIG. 7 illustrates another technique for managing the composite resource after a node is disabled. In the descriptions provided, reference to numerals of FIG. 3 are intended to illustrate exemplary components for use with a technique being described.

In FIG. 6, step 610 provides that a composite resource is established from the plurality of members 314, 324, 334 on the cluster of nodes 310, 320, 330. For purpose of explanation, it is assumed that first member 314 is initially providing the service.

In step 620, a determination is made that the first member 314 has ceased to provide the service. The determination may be made by, for example, by the framework agents 540 in consultation with first member 510 via monitor 520 or through the polling function.

Step 630 provides that the member is disabled in order to perform maintenance functions on that member. The maintenance function may be either manual or automatic. If the first node 310 is disabled, the first member 314 cannot restart. The first member 314 remains disabled and inactive until subsequently enabled. In other words, the disabling of the first member 314 is persistent. Thus, if the member is disabled and the the first node is taken down, restarting the first node will not automatically cause the first member 314 to restart.

The member or its node may be disabled as part of a planned maintenance. Thus, a member failure is not necessary to trigger the node into being disabled. In one embodiment, a failure does not cause a member to be disabled. Rather, disable is a planned action—used for extended repair and planned operations at a node.

In a method of FIG. 7, step 710 provides that a request is received to restart the first member 314. The request is received after the first member 314 has ceased to perform the service of the composite resource 340.

In step 720, a determination is made as to whether a particular member is enabled or disabled. The status may be retrieved from the registry 362, or from another memory component associated with framework 360. Thus, registry 362 may record that the member 314 was enabled or disabled just prior to it ceasing to provide the services.

If the determination in step 720 is that the first member 314 is disabled, then step 730 provides that the first member 314 is not restarted. This may occur when the first member 314 is subject to a planned maintenance. In an embodiment, this may trigger VC 350 to arrange for the service to be provided to the requesting component from another one of the members in composite resource 340.

If the determination in step 720 is that the first member 314 is enabled, then step 740 provides that an attempt is made to automatically restart the first member 314. If the first member can be restarted, the first member may rejoin the composite resource 340.

As described with FIG. 7, the enable/disable status of the members of the composite resource may be made to be persistent, and determinative of whether an attempt will be made to restart that member. The member may be disabled, so that it would not be restarted automatically during a boot up process.

The disable/enable status may be extended to the composite resource. The composite resource may be disabled as a whole, so that all members are disabled. Alternatively, the composite resource may be enabled, which would cause all members that are not disabled to be enabled. Thus, the disabling of an individual member would override the enabling of the composite resource. As a result, the failed member may be managed without disabling the entire composite resource.

Hardware Overview

Figure 8:
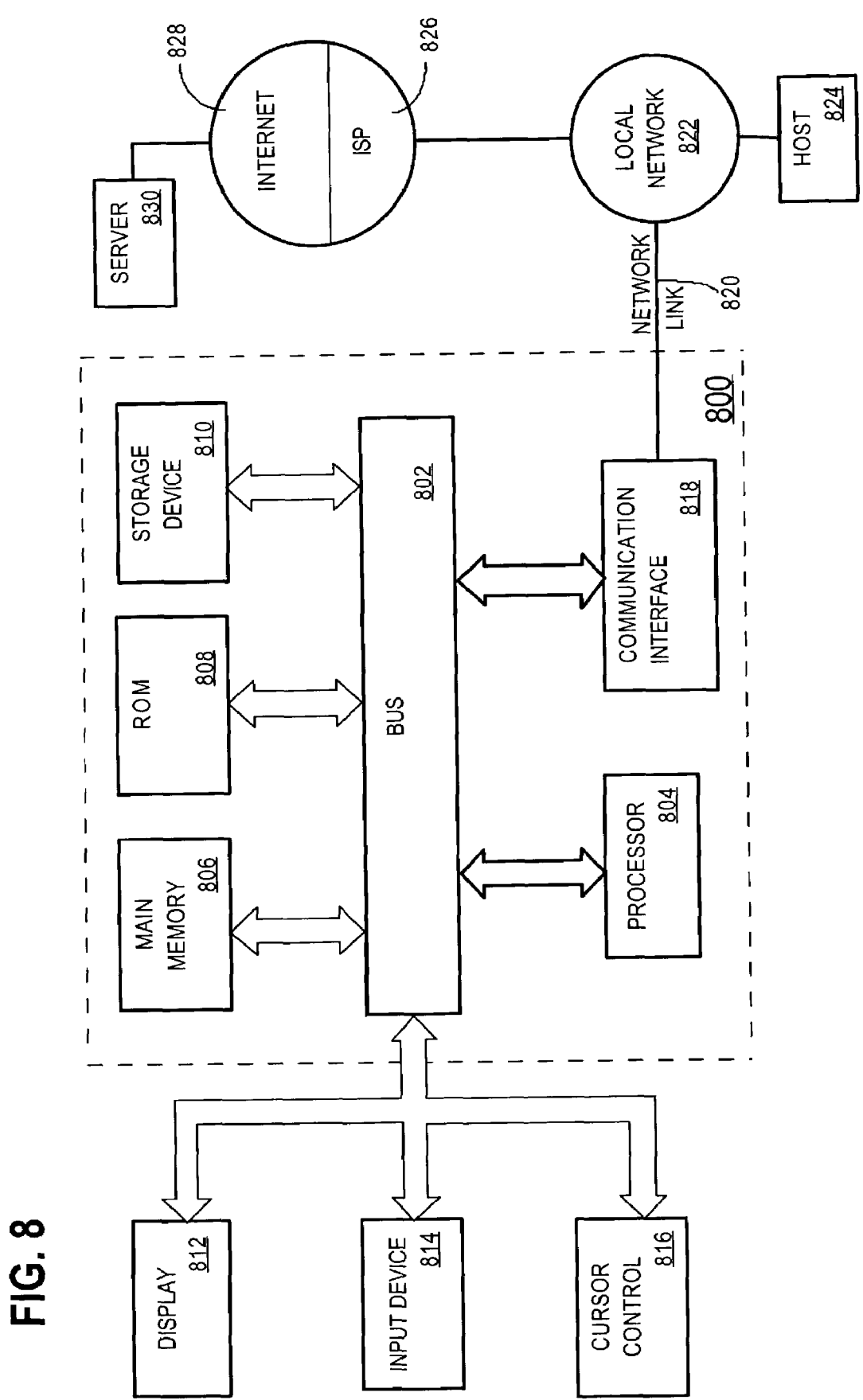
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing a plurality of components from a framework, the method comprising the steps of:
   establishing a composite resource that includes a plurality of members residing on a plurality of nodes in a networked system, where each member of said plurality of said members is capable of providing a common service, wherein said composite resource is configured to remain active as long as specified conditions are satisfied, wherein said specified conditions correspond to a user-specified minimum number of active members in the composite resource or to a user-specified minimum service level for the composite resource;
   monitoring, using framework resources, a state of each member of said composite resource;
   causing a component that requires said common service to request said common service from said framework resources;
   providing said common service to said component by:
   arranging, by said framework resources, for said common service to be provided to said component by a member of said composite resource, wherein any active member of the composite resource can be used to provide the common service to the component;
   when said member arranged to provide the common service ceases to be active, automatically causing said common service to be provided to said component by another member of said plurality of members, wherein any active member can be used to provide the common service to the component;
   maintaining a state of the composite resource independently of the state of each member of said composite resource such that the state of the composite resource remains active so long as said specified conditions are satisfied;
   continuously providing the common service from a member of the composite resource after the composite resource ceases to be active;
   in response to detecting that said specified conditions are satisfied, said composite resource ceasing to be active; and
   while not active, the composite resource continuing to be executed but no longer servicing requests for said common service.

2. The method of claim 1, wherein the plurality of members includes a set of active members and a set of inactive members, wherein members in the set of active members provide the common service in a manner that is different than the manner used by members in the set of inactive members.

3. The method of claim 1, further comprising the step of evaluating the state of the composite resource in response to one or more of the members in the plurality of members ceasing to be active.

4. The method of claim 1, further comprising the step of configuring the composite resource through framework resources based on a user-defined criteria.

5. The method of claim 1, further comprising the step of stopping the composite resource through the framework resources, so that each member in the plurality of members is stopped.

6. The method of claim 2, further comprising relocating a source of the composite resource from a node where a member in the inactive set of members resides to a node where a member in the active set of members resides, wherein just prior to performing the step of relocating the source of the composite resource, at least one of the active plurality of members was a member of the inactive set of members before the source of the composite resource was relocated.

7. The method of claim 1, further comprising measuring a performance characteristic of the composite resource from the framework resources.

8. The method of claim 1, further comprising providing an interface to enable an administrator to perform one or more operations on the composite resource through the framework resources.

9. The method of claim 1, further comprising enabling the component to be dependent on the common service irrespective of which of the plurality of members is providing the common service.

10. The method of claim 1, wherein establishing a composite resource includes enabling each of the plurality of members of the composite resource to be used with a set of resources on each member's node, wherein the set of resources on each member's node is required by the member to provide the service.

11. The method of claim 1, wherein the step of providing said service to said component includes:
   arranging for said service to be provided to said component by a first member of said composite resource from a node on which the first member resides;
   when the first member fails, causing the service to be provided to said component by a second member in the plurality of members from a node on which the second member resides, wherein the node on which the second member resides is different than the node on which the first member resides; and
   wherein prior to the first member failing, the method further includes the step of enabling the second member to provide the service to the component using a set of resources on the node on which the second member resides, the set of resources on the node on which the second member resides being required by the second member to provide the service.

12. The method of claim 1, wherein providing said service to said component includes performing at least one of reading data from and writing data to a data source that is shared by the plurality of members.

13. The method of claim 11, further comprising detecting that the first member has failed, but that the node on which the first member resides is still operative, and wherein the step of causing the service to be provided to said component by a second member is performed while one or more other resources on the node on which the first member resides are operative.

14. The method of claim 13, further comprising the step of automatically restarting the first member after detecting that the first member has failed.

15. The method of claim 13, wherein the step of causing the service to be provided to said component by a second member is performed while attempting recovery of the first member.

16. The method of claim 1, wherein establishing a composite resource includes enabling a plurality of instances of a database application to be executed on the plurality of nodes.

17. The method of claim 1, wherein the composite resource is viewed by the framework as at least partially residing on a particular node in the plurality of nodes.

18. The method of claim 1, wherein said framework is distributed onto the plurality of nodes.

19. The method of claim 1, further comprising the step of executing an application on a first node in the plurality of nodes, wherein the application depends on the composite resource.

20. The method of claim 19, further comprising providing the common service to the application executing on the first node from a first member in the plurality of members, wherein the first member resides on the first node, and wherein in response to the first member ceasing to provide the common service, the method further comprises terminating execution of the application.

21. The method of claim 19, further comprising providing the common service to the application executing on the first node from a first member in the plurality of members, wherein the first member resides on the first node, and wherein in response to the first member ceasing to provide the service, the method further comprises providing the common service to the application executing on the first node from a second member in the plurality of members that resides on a second node in the plurality of nodes.

22. The method of claim 1, wherein the method further comprises:
   initiating a member as part of the composite resource while the composite resource is running; and
   in response to the member being initiated as a member of the composite resource, causing said initiated member to ensure that the composite resource is running.

23. A computer readable non-volatile or volatile medium storing one or more sequences of instructions for managing a plurality of components from a framework, wherein execution of the one or more sequences of instructions by one or more processors causes the one or more processors to perform the steps of:
   establishing a composite resource that includes a plurality of members residing on a plurality of nodes in a networked system, where each member of said plurality of said members is capable of providing a common service, wherein said composite resource is configured to remain active as long as specified conditions are satisfied, wherein said specified conditions correspond to a user-specified minimum number of active members in the composite resource or to a user-specified minimum service level for the composite resource;
   monitoring, using framework resources, a state of each member of said composite resource;
   causing a component that requires said common service to request said common service from said framework resources;
   providing said common service to said component by:
   arranging, by said framework resources, for said common service to be provided to said component by a member of said composite resource, wherein any active member of the composite resource can be used to provide the common service to the component;

when said member arranged to provide the common service ceases to be active, automatically causing said common service to be provided to said component by another member of said plurality of members, wherein any active member can be used to provide the common service to the component;

maintaining a state of the composite resource independently of the state of each member of said composite resource such that the state of the composite resource remains active so long as said specified conditions are satisfied; continuously providing the common service from a member of the composite resource after the composite resource ceases to be active;

in response to detecting that said specified conditions are satisfied, said composite resource ceasing to be active; and while not active, the composite resource continuing to be executed but no longer servicing requests for said common service.

24. The computer readable medium of claim 23, wherein the plurality of members includes a set of active members and a set of inactive members, and wherein members in the set of active members provide the common service in a manner that is different than the manner used by members in the set of inactive members.

25. The computer readable medium of claim 23, further comprising instructions for evaluating the state of the composite resource in response to one or more members in said plurality of members ceasing to be active.

26. The computer readable medium of claim 23, further comprising instructions for configuring the composite resource through the framework resources based on a user-defined criteria.

27. The computer readable medium of claim 23, further comprising instructions for stopping the composite resource through the framework resources, so that each member in the plurality of members is stopped.

28. The computer readable medium of claim 24, further comprising instructions for relocating a source of the composite resource from a node where a member in the inactive set of members resides to a node where a member in the active set of members resides, wherein just prior to performing the step of relocating the source of the composite resource, at least one of the active plurality of members was a member of the inactive set of members before the source of the composite resource was relocated.

29. The computer readable medium of claim 23, further comprising instructions for measuring a performance characteristic of the composite resource from the framework resources.

30. The computer readable medium of claim 23, further comprising instructions for providing an interface to enable an administrator to perform one or more operations on the composite resource through the framework resources.

31. The computer readable medium of claim 23, further comprising instructions for enabling the component to be dependent on the common service irrespective of which of the plurality of members is providing the common service.

32. The computer readable medium of claim 23, wherein the instructions for establishing a composite resource include instructions for enabling each of the plurality of members of the composite resource to be used with a set of resources on each member's node, wherein the set of resources on each member's node is required by the member to provide the service.

33. The computer readable medium of claim 23, wherein instructions for providing said service to said component include instructions for performing the steps of:

arranging for said service to be provided to said component by a first member of said composite resource from a node on which the first member resides;

when the first member ceases to be active, causing the service to be provided to said component by a second member in the plurality of members from a node on which the second member resides, wherein the node on which the second member resides is different than the node on which the first member resides; and wherein prior to the first member ceasing to be active, the computer-readable medium further includes instructions for performing the step of enabling the second member to provide the service to the component using a set of resources on the node on which the second member resides, the set of resources on the node on which the second member resides being required by the second member to provide the service.

34. The computer readable medium of claim 23, wherein instructions for providing said service to said component include instructions for performing at least one of reading data from and writing data to a data source that is shared by the plurality of members.

35. The computer readable medium of claim 33, further comprising instructions for detecting that the first member has failed, but that the node on which the first member resides is still operative, and wherein the step of causing the service to be provided to said component by a second member is performed while one or more other resources on the node on which the first member resides are operative.

36. The computer readable medium of claim 35, wherein instructions for performing the step of causing the service to be provided to said component by a second member include instructions so that said step is performed while attempting recovery of the first member.

37. The computer readable medium of claim 23, wherein instructions for establishing a composite resource include instructions for enabling a plurality of instances of a database application to be executed on the plurality of nodes.

38. The computer readable medium of claim 23 wherein the composite resource is viewed by the framework as at least partially residing on a particular node in said plurality of nodes.

39. The computer readable medium of claim 23, wherein said framework is distributed onto the plurality of nodes.

40. The computer readable medium of claim 23, further comprising instructions for performing the step of executing an application on a first node in the plurality of nodes, wherein the application depends on the composite resource.

41. The computer readable medium of claim 40, further comprising instructions for providing the common service to the application executing on the first node from a first member in the plurality of members, wherein the first member resides on the first node, and wherein in response to the first member ceasing to provide the common service, the computer readable medium further comprises instructions for terminating execution of the application.

42. The computer readable medium of claim 40, further comprising instructions for providing the common service to the application executing on the first node from a first member in the plurality of members, wherein the first member resides on the first node, and wherein in response to the first member ceasing to provide the service, the computer readable medium further comprises instructions for providing the common service to the application executing on the first node from a second member in the plurality of members that resides on a second node in the plurality of nodes.

43. The computer readable medium of claim 23, wherein the computer readable medium further comprises instructions for performing the steps of:

initiating a member as part of the composite resource while the composite resource is running; and in response to the member being initiated as a member of the composite resource, causing said initiated member to ensure that the composite resource is running.

44. A computer readable non-volatile or volatile medium storing one or more sequences of instructions for managing a plurality of components from a framework, wherein execution of the one or more sequences of instructions by one or more processors causes the one or more processors to perform the steps of:

establishing a composite resource that includes a first plurality of members and a second plurality of members, the first and second pluralities of members residing on a plurality of nodes in a networked system, each of said first plurality of members being able to provide a common service, and each of said second plurality of members being able to provide the common service when activated;

wherein a state of the composite resource is maintained independently of a state of each member that is active in the composite resource, such that the state of the composite resource remains active so long as specified conditions are satisfied, wherein said specified conditions correspond to a user-specified minimum number of active members in the composite resource or to a user-specified minimum service level for the composite resource;

arranging, by said framework, for a member in the first plurality of members to provide the service to a first component that requests the common service, wherein any member of the first plurality of members can be used to provide the service to the first component;

in response to one or more of the members in the first plurality of members becoming inactive, further comprising instructions for performing the steps of:

activating a member in the second plurality of members; and automatically providing the common service using an active member in one of the first plurality of members or the second plurality of members.

45. The computer readable medium of claim 44, wherein instructions for automatically providing the common service using an active member in one of the first plurality of members or the second plurality of members include instructions for maintaining a cardinality of the members that are active to provide the common service of the composite resource.

46. The computer readable medium of claim 45, further comprising instructions for performing the step of expanding the cardinality by activating multiple members in the second plurality of members into providing the common service.

47. The computer readable medium of claim 44, wherein instructions for arranging for a member in the first plurality of members to provide the common service include instructions for using resources of the framework shared by the first plurality of members and the second plurality of members.

48. The computer readable medium of claim 47, further comprising instructions for maintaining status information about the first plurality of members and the second plurality of members through the framework resources.

* * * * *

UNITED STATES PATENT AND TRADEMARK OFFICE
CERTIFICATE OF CORRECTION

| | | |
|---|---|---|
| PATENT NO. | : 7,475,127 B2 | Page 1 of 1 |
| APPLICATION NO. | : 10/308918 | |
| DATED | : January 6, 2009 | |
| INVENTOR(S) | : Colrain et al. | |

It is certified that error appears in the above-identified patent and that said Letters Patent is hereby corrected as shown below:

On page 2, under "Other Publications", in column 2, line 1, delete "Prperty" and insert -- Property --, therefor.

In column 6, lines 13-21, below "resource 240." delete "In an embodiment, the system 200 includes a first node 210, a second node 220, and a third node 230. The first node 210 includes a first resource 212, a first member 214, and a first component 216. The second node 220 includes a second resource 222, a second member 24, and a second component 226. Likewise, third node 230 includes a third resource 232, a third member 234, and a third component 236. The first member 214, second member 224, and third member 234 may be established to form a real composite resource 240.".

In column 16, line 27, delete "agents540" and insert -- agents 540 --, therefor.

In column 17, line 44, after "the" delete "the".

Signed and Sealed this

Twenty-seventh Day of April, 2010

David J. Kappos
*Director of the United States Patent and Trademark Office*